US009137687B2

(12) United States Patent
Gottimukkala et al.

(10) Patent No.: US 9,137,687 B2
(45) Date of Patent: Sep. 15, 2015

(54) PIPELINING REGISTRATION AND CONFLICT DETECTION IN DUAL-SIM-DUAL-ACTIVE COMMUNICATION DEVICE COEXISTENCE

(71) Applicant: QUALCOMM Incorporated, San Diego, CA (US)

(72) Inventors: Narendra Varma Gottimukkala, San Diego, CA (US); Erdogan Dede, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 14/019,822

(22) Filed: Sep. 6, 2013

(65) Prior Publication Data

US 2015/0071088 A1    Mar. 12, 2015

(51) Int. Cl.
*H04W 4/00* (2009.01)
*H04W 40/16* (2009.01)
*H04W 24/02* (2009.01)
*H04W 72/12* (2009.01)
*H04W 88/06* (2009.01)

(52) U.S. Cl.
CPC .......... *H04W 24/02* (2013.01); *H04W 72/1215* (2013.01); *H04W 88/06* (2013.01)

(58) Field of Classification Search
None
See application file for complete search history.

(56) References Cited

U.S. PATENT DOCUMENTS

| 7,610,057 | B2 | 10/2009 | Bahl et al. | |
| 8,494,580 | B1* | 7/2013 | Weinrib et al. | 455/553.1 |
| 2003/0214914 | A1* | 11/2003 | Cain | 370/252 |
| 2004/0179494 | A1* | 9/2004 | Attar et al. | 370/332 |
| 2008/0200120 | A1 | 8/2008 | Ruuska et al. | |
| 2009/0034491 | A1* | 2/2009 | Adams et al. | 370/337 |
| 2009/0185521 | A1* | 7/2009 | Li et al. | 370/315 |
| 2009/0196214 | A1* | 8/2009 | Li et al. | 370/315 |
| 2010/0279701 | A1* | 11/2010 | Chen | 455/452.2 |
| 2010/0330977 | A1 | 12/2010 | Kadous et al. | |
| 2011/0090982 | A1* | 4/2011 | Chen et al. | 375/285 |
| 2011/0110311 | A1 | 5/2011 | Krause et al. | |
| 2013/0012135 | A1 | 1/2013 | Ruohonen et al. | |

FOREIGN PATENT DOCUMENTS

| GB | 2492577 A | 1/2013 |
| WO | 2011/008556 A1 | 1/2011 |

OTHER PUBLICATIONS

International Search Report and Written Opinion—PCT/US2014/054141—ISA/EPO—Dec. 22, 2014.

\* cited by examiner

*Primary Examiner* — Chi H Pham
*Assistant Examiner* — Soon-Dong D Hyun
(74) *Attorney, Agent, or Firm* — The Marbury Law Group, PLLC

(57) ABSTRACT

The various embodiments include a dual-SIM-dual-active (DSDA) device and methods for implementing pipelining of operation registration data and conflict checking to predict radio frequency co-existence interference between two subscriptions operating on the DSDA device. The DSDA device may predict when a subscription (the "aggressor") de-senses the other subscription (the "victim") as a result of the aggressor's scheduled operations, by analyzing the conflicting operation registration data prior to the scheduled operation execution time. The operation registration data is received and analyzed close in time to the scheduled execution of the operation to limit the possibility of changes in the operation schedule and registration data.

36 Claims, 8 Drawing Sheets

PIPELINING REGISTRATION AND CONFLICT DETECTION IN DUAL-SIM-DUAL-ACTIVE COMMUNICATION DEVICE COEXISTENCE

BACKGROUND

Some new designs of wireless communication devices—such as smart phones, tablet computers, laptop computers, and routers—contain hardware and/or software elements that provide access to multiple wireless communication networks. For example, a wireless communication device can have more than one radio frequency communication circuits (often referred to as "RF chains") for accessing one or more wireless local area networks ("WLANs") and/or wireless wide area networks ("WWANs"). When multiple reception ("Rx") and/or transmission ("Tx") operations are implemented, or co-exist, on a wireless communication device, these operations may overlap and interfere with each other.

This operation interference may occur in a wireless communication device with one or more RF chains. In a wireless communication device with multiple RF chains, the antennas of the RF chains may be in close proximity to each other. This close proximity may cause one RF chain to desensitize or interfere with the ability of another during the concurrent use of the RF chains.

Receiver desensitization ("de-sense"), or degradation of receiver sensitivity, may result from noise interference from a nearby transmitter. In particular, when two radios are close together with one transmitting on the uplink and the other receiving on the downlink, the feedback from the transmitter may be picked by the receiver or otherwise interfere with reception of a weaker signal (e.g., from a distant base station). As a result, the received signals may become corrupted and difficult or impossible to decode. Further, feedback from the transmitter can be detected by a power monitor that measures the receive signal, which would cause the mobile device to falsely determine the presence of a base station. In particular, receiver de-sense may present a challenge in multi-radio devices, such as devices configured with multiple SIMs, due to the necessary proximity of transmitter and receiver.

Other problems can occur in a wireless communication device with multiple RF chains. When executing multiple concurrent Tx operations the transmissions may create a disruptive intermodulation product or a battery current limit problem. Tx signals of different, but close, frequencies may be transmitted concurrently. Since Tx signals produce sideband noise on either side of a carrier frequency, the sideband noise may be of a frequency that overlaps with the frequency of another Tx signal. The concurrent transmission of overlapping frequencies can result in unwanted amplitude modulation causing noise on those overlapping frequencies and making it more difficult for receivers to distinguish signals. The battery current limit problem results from the power demands on the battery to concurrently transmit signals. The battery may not be able to provide sufficient current to multiple Tx chains, resulting in weaker signals and battery drain.

In a wireless communication device with one RF chain, multiple operations may require the use of the same function of the RF chain at the same time. For example, if two Rx operations are occurring at the same time, only one operation can have access to the Rx potion of the RF chain (or "Rx chain") at a time. This may result in a prolonged delay or cancellation of the Rx operation that does not get to use the Rx chain.

SUMMARY

The methods and apparatuses of various embodiments provide circuits and methods for mitigating interference between communication operations in a wireless communication device having a shared processor configured to execute the method including receiving, in a co-existence manager configured to be executed by the shared processor, data of a first future communication operation of a first communication circuit to occur in a future time slot prior to the future time slot, comparing the data of the first future communication operation with data of a second future communication operation of a second communication circuit prior to the future time slot by the co-existence manager, determining based on the data of the first and second future communication operations whether a conflict will occur between the first and second future communication operations during the future time slot by the co-existence manager, and implementing an interference mitigating operation during the future time slot in response to determining that the conflict will occur between the first and second future communication operations during the future time slot, by the shared processor.

In an embodiment method, determining based on the data of the first and second future communication operations whether the conflict will occur between the first and second future communication operations during the future time slot may include calculating an amount of interference from the second future communication operation affecting the first future communication operation during the future time slot by the co-existence manager, and determining whether the calculated amount of interference will exceed an acceptable threshold by the co-existence manager. Another embodiment method may further include receiving, in the co-existence manager, the data of the second future communication operation prior to the future time slot.

In an embodiment method, receiving the data of the first future communication operation may further include receiving the data of the first future communication operation at a first predetermined time prior to the future time slot by the co-existence manager, the method further including receiving the data of the second future communication operation at a second predetermined time prior to the future time slot by the co-existence manager, in which comparing the data of the first future communication operation with the data of the second future communication operation may further include comparing the data of the first future communication operation with the data of the second future communication operation at a third predetermined time prior to the future time slot by the co-existence manager. In an embodiment method, the first, second, and third predetermined times prior to the future time slot are measured on a microscopic scale.

In an embodiment method, determining based on the data of the first and second future communication operations whether the conflict will occur between the first and second future communication operations during the future time slot may include determining whether the first and second future communication operations are scheduled to implement during an overlapping time period by the co-existence manager, determining whether the first future communication operation has a priority greater than that of the second future communication operation by the co-existence manager, and determining whether the future communication operations interference will cause a signal strength of one communication operation to fall below a threshold signal value by the co-existence manager.

Another embodiment method may further include affiliating a subscriber identification with a first wireless communication subscription implemented on the first communication circuit by the co-existence manager, in which the first future communication operation supports the first wireless communication subscription and the second future communication operation supports a second wireless communication subscription implemented on the second communication circuit. Another embodiment method may include storing the first data of the first future communication operation in a data buffer by the co-existence manager, and storing the data of the second future communication operation to a second data buffer by the co-existence manager, in which comparing the data of the first future communication operation with the data of the second future communication operation comprises comparing data stored in the first data buffer to data stored in the second data buffer by the co-existence manager. In an embodiment method, the data of the first and second future communication operations comprise one or more of an operation type, a begin operation indicator, an end operation indicator, an operation frequency, and an operation priority. Another embodiment method may include receiving, in the co-existence manager, data of a third future communication operation to occur in another future time slot prior to the other future time slot, comparing the data of the third future communication operation with data of a forth future communication operation of the second communication circuit prior to the other future time slot by the co-existence manager, determining based on the data of the third and fourth future communication operations whether a conflict will occur between the third and fourth future communication operations during the other future time slot by the co-existence manager, and implementing the interference mitigating operation during the other future time slot in response to determining that the conflict will occur between the third and fourth future communication operations during the other future time slot by the shared processor.

An embodiment includes a non-transitory processor-readable medium having stored thereon processor-executable software instructions configured to be executed by a shared processor to cause mitigation of interference between communication operations in a wireless communication device, the operations including receiving, in a co-existence manager configured to be executed by the shared processor, data of a first future communication operation of a first communication circuit to occur in a future time slot prior to the future time slot, comparing the data of the first future communication operation with data of a second future communication operation of a second communication circuit prior to the future time slot by the co-existence manager, determining based on the data of the first and second future communication operations whether a conflict will occur between the first and second future communication operations during the future time slot by the co-existence manager, and implementing an interference mitigating operation during the future time slot in response to determining that the conflict will occur between the first and second future communication operations during the future time slot, by the shared processor.

An embodiment includes a wireless communication device capable of interacting with a plurality of wireless networks, including a plurality of communication circuits, in which each communication circuit is associated with one or more active wireless communication subscriptions, a shared processor coupled to the communication circuits, in which the shared processor is configured with processor-executable instructions to perform operations including implementing a protocol stack for each active communication subscription, implementing a modem for each communication circuit, and implementing a co-existence manager configured to perform operations including receiving, from a first communication circuit, data of a first future communication operation to occur in a future time slot prior to the future time slot, comparing the data of the first future communication operation with data of a second future communication operation of a second communication circuit prior to the future time slot, determining based on the data of the first and second future communication operations whether a conflict will occur between the first and second future communication operations during the future time slot, and implementing an interference mitigating operation during the future time slot in response to determining that the conflict will occur between the first and second future communication operations during the future time slot.

An embodiment includes a device, including means for receiving, in a co-existence manager configured to be executed by a shared processor, data of a first future communication operation of a first communication circuit to occur in a future time slot prior to the future time slot, means for comparing the data of the first future communication operation with data of a second future communication operation of a second communication circuit prior to the future time slot by the co-existence manager, means for determining based on the data of the first and second future communication operations whether a conflict will occur between the first and second future communication operations during the future time slot by the co-existence manager, and means for implementing an interference mitigating operation during the future time slot in response to determining that the conflict will occur between the first and second future communication operations during the future time slot by the shared processor.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
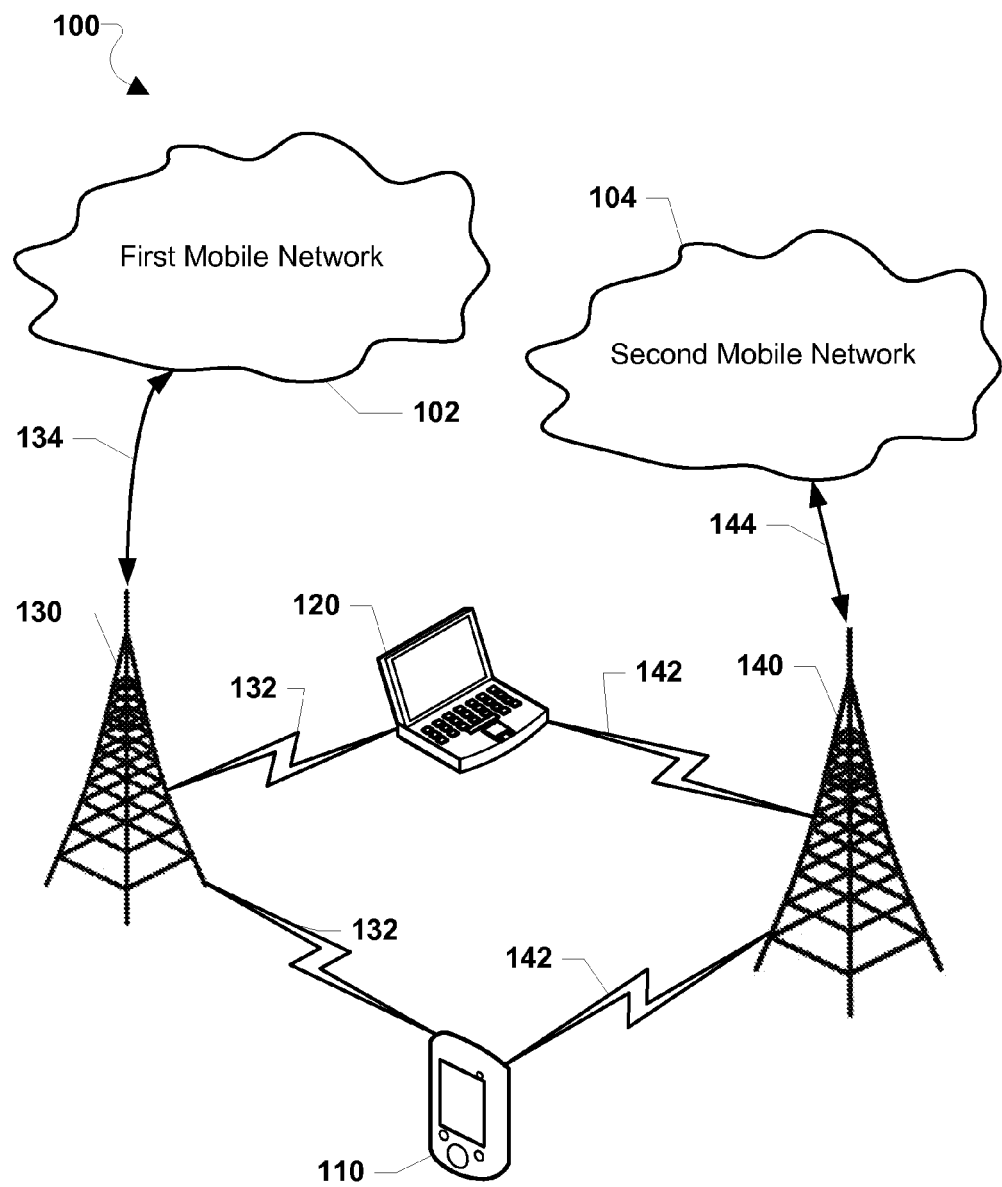
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments herein may refer to a dual-SIM dual active ("DSDA") device for exemplary purposes. Descriptions of the embodiments may apply to any electronic devices that may individually maintain a plurality of subscriptions to a plurality of mobile networks through one or more radio communication circuits. In particular multi-SIM multi-active devices of any combination of number of SIM (subscriber identity module) cards and concurrently active subscriptions may also implement the various embodiments. Moreover, a SIM card may not be required for a wireless communication device to implement the various embodiments, which may apply to any form of wireless communication.

As used herein, the term "DSDA device" refers to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for connecting to at least two mobile communication networks. The various embodiments may be useful in mobile communication devices, such as smart phones, and so such devices are referred to in the descriptions of the various embodiments.

DSDA devices include two SIM cards that enable a user to connect to different mobile networks (or different accounts on the same network) while using the same DSDA device. Each SIM card serves to identify and authenticate a subscriber using a particular DSDA device for designated subscriptions. For example, a SIM card may be associated with subscriptions to GSM, TDSCDMA, CDMA2000, and WCDMA networks. In the various embodiments, DSDA devices may also include two RF chains so that each network communication supported by each SIM can be accomplished concurrently if interference problems are managed.

DSDA devices can suffer from interference between two communications being accomplished concurrently, such as when one communication session is transmitting ("Tx") at the same time as another RF chain is attempting to receive ("Rx"). As used herein, the term "victim" refers to the subscription suffering from interference and, the term "aggressor" refers to the subscription causing the interference. In one example DSDA device, the victim may be attempting to receive while the aggressor attempts to transmit. In various embodiments, an aggressor's transmissions may de-sense the victim's reception. In other words, the victim may receive the aggressor's transmissions, which act as noise and may interfere with the victim's ability to receive wanted signals.

In DSDA devices, an aggressor's transmissions may cause severe impairment to the victim's ability to receive transmissions. This interference may be in the form of blocking interference, harmonics, intermodulation, and other noises and distortion. Such interference may significantly degrade the victim's receiver sensitivity, voice call quality and data throughput. These effects may result in a reduced network capacity. The aggressor's transmission may also cause the victim to experience a receiver sensitivity that is drastically degraded, call quality degradation, higher rates for call drops and radio link failures, and data throughput degradation, which may potentially cause the victim to lose a data connection.

Other problems which may occur in a wireless communication device with multiple RF chains, or communication circuits include, for example, an aggressor Tx circuit producing a noise inducing Tx operation, and a victim Tx circuit being interfered with. When executing multiple concurrent Tx operations the aggressor transmission may create a disruptive intermodulation product or a battery current limit problem. With multiple Tx operations, sideband noise on either side of a carrier frequency of the aggressor Tx signal may overlap with the frequency of the victim Tx signal. The concurrent transmission of overlapping frequencies can result in unwanted amplitude modulation causing noise on those overlapping frequencies and making it more difficult for receivers to distinguish the transmission signals.

In another example, a battery current limit problem resulting from the power demands on the battery to concurrently transmit signals may result in a Tx chain amplifying an interfering signal. Also, the battery may not be able to provide sufficient current to the other multiple Tx chains, resulting in weaker signals and battery drain. In either of these examples, the aggressor is the Tx circuit that interferes with the other Tx operation or draws more power from the power source. In such circumstances the Tx chain receiving the interfering signal or not being apportioned sufficient power to properly execute its Tx operation is the victim.

Even a mobile device having a single RF chain supporting multiple subscriptions may encounter co-existence problems. An example of a single RF chain co-existence issue is when and aggressor subscription monopolizes the RF chain resources delaying or completely blocking the victim subscription from using the RF chain. The aggressor subscription may have priority over the victim subscription or may require longer time periods for using the RF chain resources. The victim subscription may have difficulty aligning with a time where the aggressor subscription does not preempt the victim for use of the RF chain resources.

Some operation co-existence issues arise at microscopic time intervals and require high time resolution. The reaction time to recover after a conflict of operations is recognized must be very short to minimize the impact on the performance of the wireless communication device. The various embodiments efficiently manage the de-sense and other Rx/Tx collision issues that can result from the execution of concurrent communication operations. Herein, the managing of co-existence issues will be described using de-sense as an exemplary co-existence issue. The descriptions regarding de-sense are not limiting and many other co-existence issues may be managed in the same or analogous ways.

The various embodiments address this interference problem by providing methods for implementing pipelined operation registration and conflict checking, which predict the effects of de-sense on the victim and allows timely implementation of mitigation techniques for dual-SIMs without new hardware. In this way the interference and service degradation stemming from co-existence issues may be avoided or effectively planned for such that their effect can be reduced before they occur, rather than reacting to detected interference and service degradation caused by co-existence issues (i.e., after they occur).

Embodiments may include registering operations for various subscriptions close in time to the planned execution of the operations and comparing registration data for each potentially overlapping operation to predict the possibility of creating a co-existence issue. The registration and conflict checking may occur mere milliseconds, or even microseconds, before the planned execution of the operations. This tight timeframe provides for greater accuracy in the planning for co-existence issues because it is less likely that the operations will be modified with such little time remaining before their planned execution.

The various embodiments may implement the pipelining of operation registration and conflict checking in software. The software of multiple functions involved in the pipelining of operation registration and conflict checking, and in the implementation of the operations may be executed on a shared processor to reduce the time needed to process the co-existence issues and implement mitigation techniques. The software for the respective subscriptions may relate their operations to a common timeline so that the shared processor may accurately determine when overlapping operations may occur.

The various embodiments may be implemented within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first DSDA device 110 may be in communication with the first mobile network 102 through a cellular connection 132 to a first base station 130. The first DSDA device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A second DSDA device 120 may similarly communicate with the first mobile network 102 through a cellular connection 132 to a first base station 130. The second DSDA device 120 may communicate with the second mobile network 104 through a cellular connection 142 to the second base station 140. Cellular connections 132 and 142 may be made through two-way wireless communication links, such as 4G, 3G, CDMA, TDMA, WCDMA, GSM, and other mobile telephony communication technologies. Other connections may include various other wireless connections, including WLANs, such as Wi-Fi based on IEEE 802.11 standards, and wireless location services, such as GPS.

Figure 2:
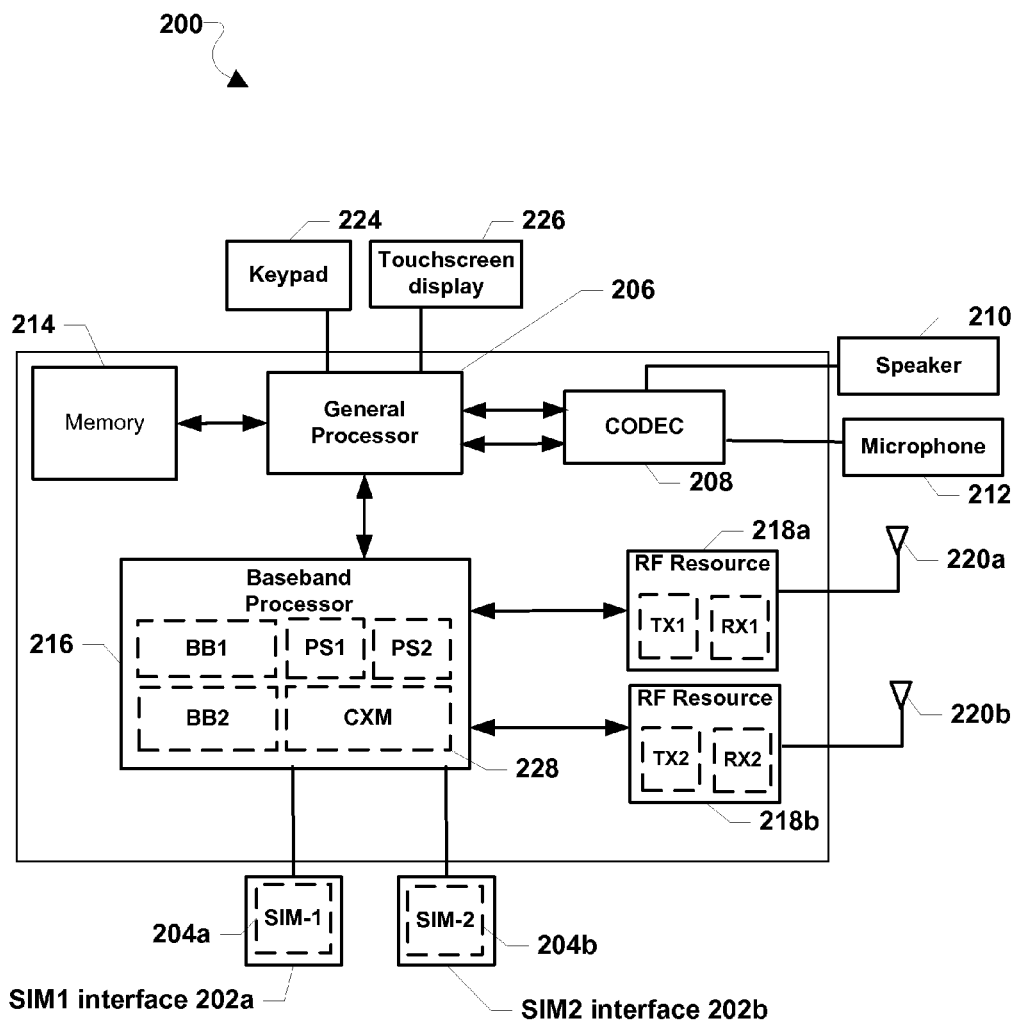
FIG. 2 is a component block diagram of an embodiment dual-SIM dual active wireless communications device.

FIG. 2 is a functional block diagram of a DSDA device 200 that is suitable for implementing the various embodiments. The DSDA device 200 may include a first SIM interface 202a, which may receive a first identity module SIM-1 204a that is associated with the first subscription. The DSDA device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM may further store a Home Public-Land-Mobile-Network (HPLMN) code to indicate the SIM card network operator provider. An Integrated Circuit Card Identity (ICCID) SIM serial number may be printed on the SIM for identification.

Each DSDA device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain.

The memory 214 may store operating system (OS), as well as user application software and executable instructions. The memory 214 may also store application data, such as an array data structure.

The general processor 206 and memory 214 may each be coupled to at least one baseband modem processor 216. Each SIM in the DSDA device 200 (e.g., SIM-1 202a and SIM-2 202b) may be associated with a baseband-RF resource chain. Each baseband-RF resource chain may include baseband modem processor 216 to perform baseband/modem functions for communications on a SIM, and one or more amplifiers and radios, referred to generally herein as RF resources 218. In an embodiment, baseband-RF resource chains may interact with a shared baseband modem processor 216 (i.e., a single device that performs baseband/modem functions for all SIMs on the wireless device). Alternatively, each baseband-RF resource chain may include physically or logically separate baseband processors (e.g., BB1, BB2).

In some embodiments, the baseband modem processor 216 may be an integrated chip capable of managing the protocol stacks of each of the SIMs or subscriptions (e.g., PS1, PS2) and implementing a co-existence manager software 228 (e.g., CXM). By implementing modem software, subscription protocol stacks, and the co-existence manager software 228 on this integrated chip 216, thread based instructions may be used on the integrated chip 216 to communicate instructions between the software implementing the pipelining of the operations and conflict checking, the mitigation techniques for co-existence issues, and the Rx and Tx operations. Implementing these software on a shared processor 216 allows for fast communication between the software processes enabling the pipelining of the registration operation and conflict checking to be executed in a microscopic time frame. If some of the software were to be implemented on a separate processor, the communication between the software processes would be subject to increased communication lags resulting from slower conducting conduits, limited communication paths, and slower communication protocols.

RF resources 218a, 218b may each be communication circuits or transceivers that perform transmit/receive functions for the associated SIM of the wireless device. RF resources 218a, 218b may be communication circuits that include separate transmit and receive circuitry, or may include a transceiver that combines transmitter and receiver functions. The RF resources 218a, 218b may be coupled to a wireless antenna (e.g., a first wireless antenna 220a and a second wireless antenna 220b). The RF resources 218a, 218b may also be coupled to the baseband modem processor 216.

In a particular embodiment, the general processor 206, memory 214, baseband processor(s) 216, and RF resources 218a, 218b may be included in the DSDA device 200 as a system-on-chip. In another embodiment, the first and second SIMs 202a, 202b and their corresponding interfaces 204a, 204b may be external to the system-on-chip. Further, various input and output devices may be coupled to components on the system-on-chip, such as interfaces or controllers.

Example user input components suitable for use in the DSDA device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in DSDA device 200 to enable communication between them, as is known in the art.

Figure 3:
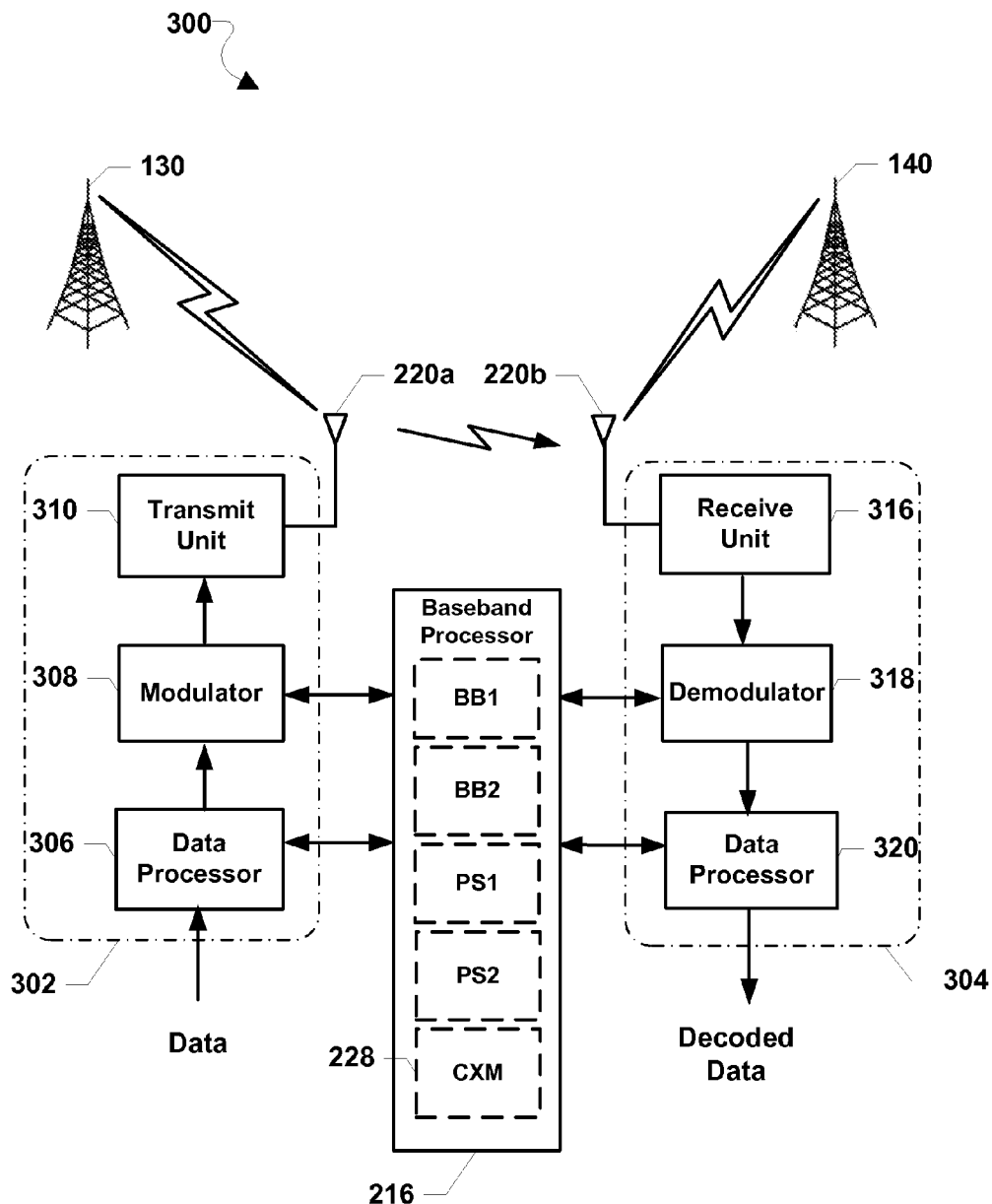
FIG. 3 is a component block diagram illustrating the interaction between components of different transmit/receive chains in an embodiment dual-SIM dual active wireless communications device.

FIG. 3 illustrates transmit and receive components in separate RF resources. For example, a transmitter 302 may be part of one RF resource 218a, and a receiver 304 may be part of another RF resource 218b, as described above with reference to FIG. 2. In a particular embodiment, the transmitter 302 may include a data processor 306 that may format, encode, and interleave data to be transmitted. The transmitter 302 may include a modulator 308 that modulates a carrier signal with encoded data, for example, by performing Gaussian minimum shift keying (GMSK). One or more transmit circuits 310 may condition the modulated signal (e.g., by filtering, amplifying, and up-converting) to generate a RF modulated signal for transmission. The RF modulated signal may be transmitted, for example, to a base station 130 via an antenna, such as antenna 220a.

At the receiver 304, an antenna 220b may receive RF modulated signals from a base station 140 for example. However, the antenna 220b may also receive some RF signaling from the transmitter 302, which ultimately competes with the desired signal from the base station 140. One or more receive circuits 316 may condition (e.g., filter, amplify, and down-convert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the wireless device. Operations of the transmitter and the receiver may be controlled by a processor, such as a baseband processor(s) 216. In the various embodiments, each of the transmitter 302 and receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry (i.e., as transceivers associated with SIM-1 and SIM-2).

As discussed above, receiver de-sense may occur when data associated with a first SIM transmitted on the uplink interferes with receive activity on a different transmit/receive chain that may be associated with a second SIM. The desired signals may become corrupted and difficult or impossible to decode. Further, noise from the transmitter may be detected by a power monitor that measures the signal strength of surrounding cells, which may cause the DSDA device to falsely determine the presence of a nearby cell site.

In an embodiment, upon detecting that receiver de-sense may occur due to interference from transmit signals associated with another SIM in the DSDA device, the DSDA device may implement an algorithm to select an optimal de-sense mitigating action, such as robust Rx processing. In an embodiment, implementing robust Rx processing may include ignoring or assigning lower significance to the jammed portion of the received signal. In another embodiment, the DSDA may cancel the interfering data from the received signal, which may be more costly than ignoring the jammed portion of the received signal.

By tailoring the mitigating action to various properties of the transmitter and receiver, the DSDA device may maximize reduction in de-sense on the victim while minimizing possible degradation of service. The mitigating actions may be taken as soon as the potential for de-sense is determined without waiting for response from the network. Predicting de-sense may be accomplished through pipelining DSDA Rx/Tx operation registration from all active subscriptions, and conflict checking the DSDA Rx/Tx operations prior to the DSDA device implementing the operations.

Figure 4:
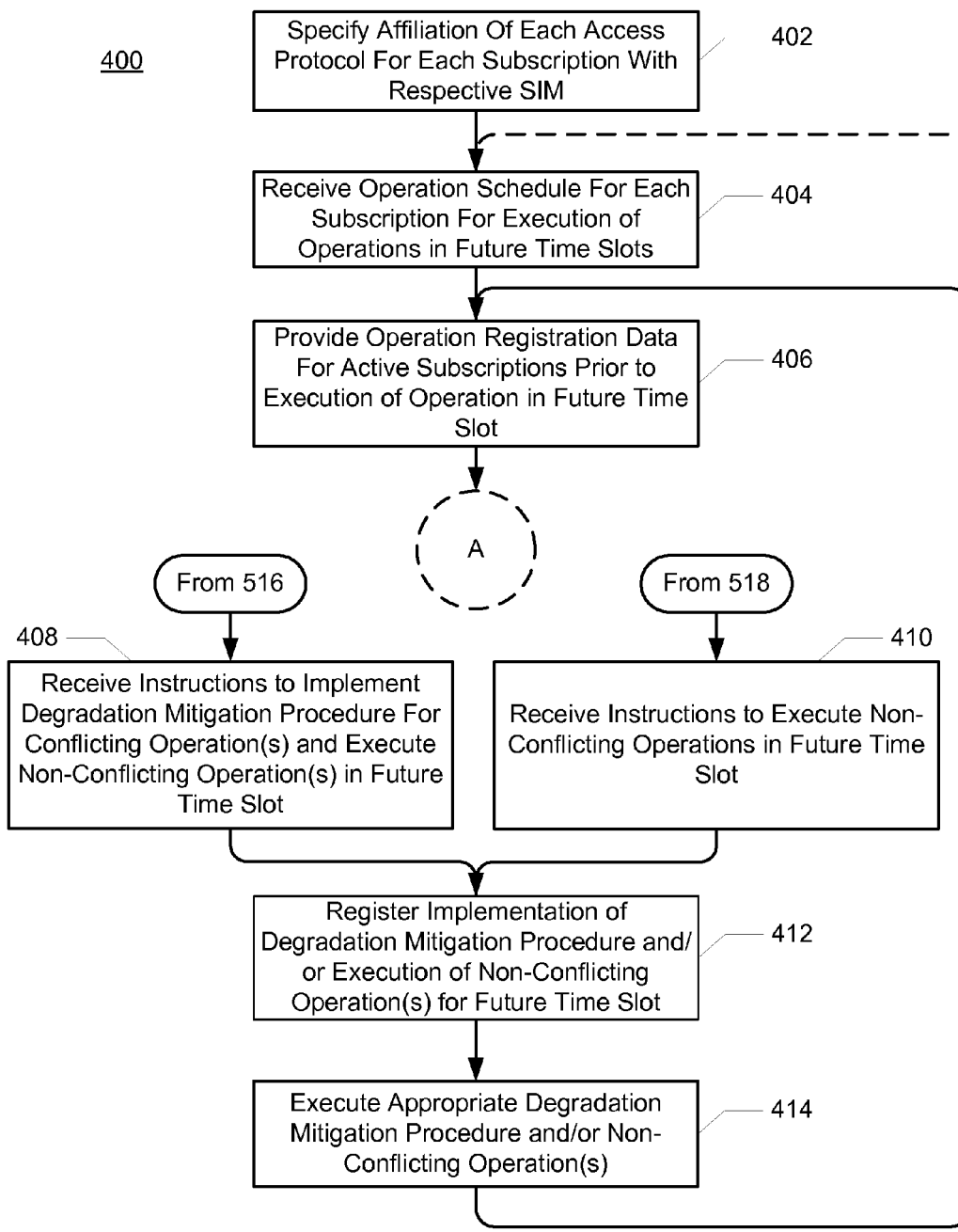
FIG. 4 is a process flow diagram illustrating an embodiment method for initiating operation registration and conflict detection pipelining.
Figure 5:
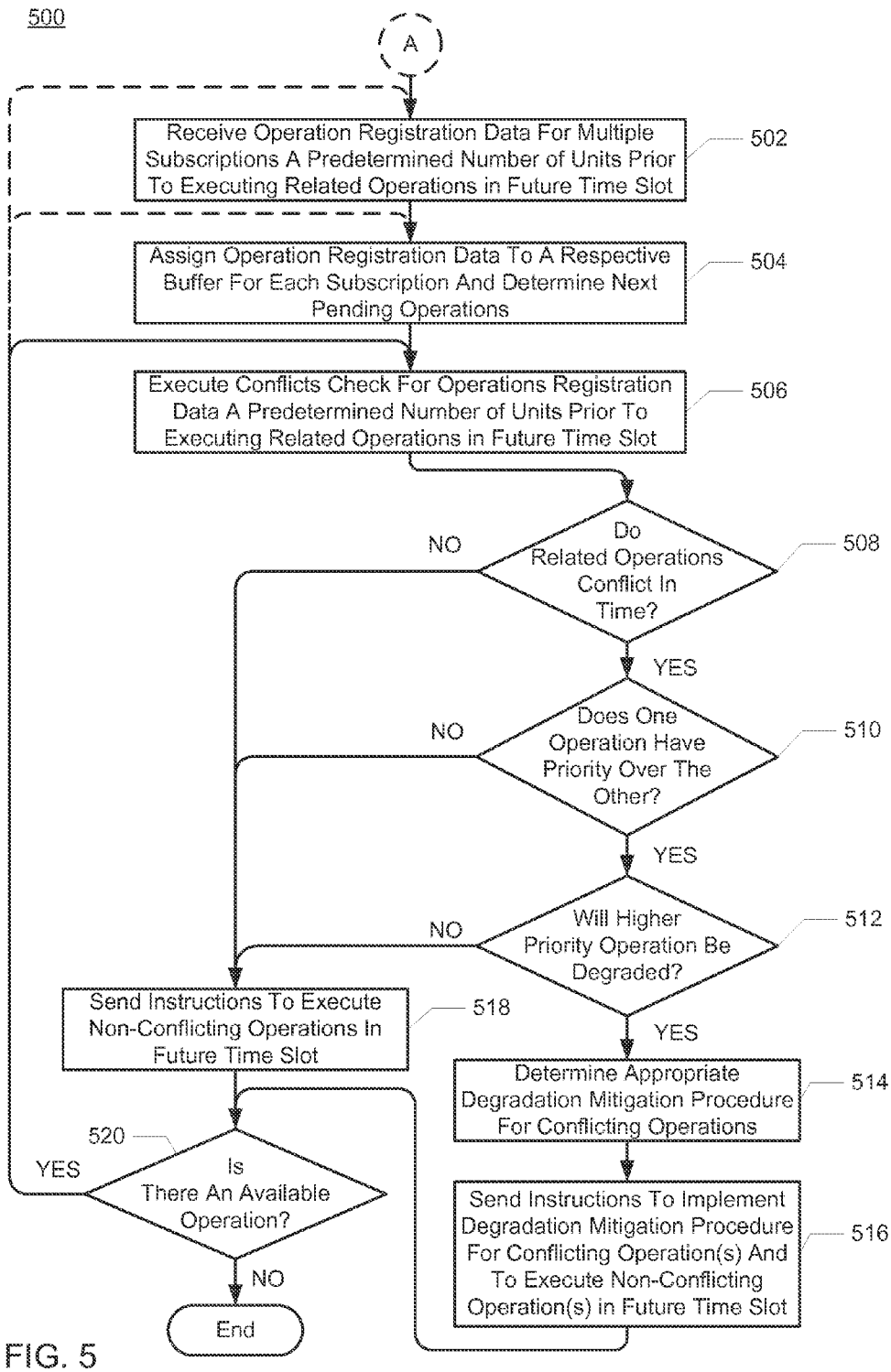
FIG. 5 is a process flow diagram illustrating an embodiment method for operation registration and conflict detection pipelining.

FIGS. 4 and 5 illustrate an embodiment methods 400 and 500 that may be executed to anticipate when desense will occur and taking proactive actions to mitigate the consequences.

FIG. 4 illustrates an embodiment method 40 for initiating operation registration and conflict detection pipelining. In block 402 each SIM 204a, 204b may specify the access protocol for each related subscription to the shared processor 216. This may cause the protocol stacks of each subscription to be loaded onto the shared processor 216 so that it may recognize the operations for each subscription, properly identify the operations for the co-existence manager operations, and assign the operations to the appropriate RF resources 218a, 218b for implementation.

The DSDA device 200 may receive a schedule of operations for each active subscription indicating operations to be executed in the near future in block 404. The schedules may be received by the RF resources 218a, 218b and stored in their respective SIMs 204a, 204b so that the SIMs 204a, 204b may provide the shared processor 216 with the future operations in a timely manner. The shared processor 216 may also directly store the schedule of operations for each subscription. The operation schedules may be provided to the DSDA device 200 by the networks of the respective subscriptions. In either event, whether the schedules are provided to the shared processor 216 from the SIMs 204a, 204b or directly from the RF resources 218a, 218b, the protocol stacks for each subscription, PS1 and PS2, receive their respective schedules and pass the relevant information to the co-existence manager 228, as described below.

In block 406 the protocol stacks PS1, PS2 may provide the co-existence manager 228 with the operation registration data from the schedule of operations prior to the execution of the operations via the shared processor 216 (output A). The co-existence manager 228 may receive the operation registration data near in time to the execution of the operations such that the difference in time is mere milliseconds, or even microseconds. The operation registration data may include various data representing characteristics of the related operation. Some such data may include: the type (either Rx or Tx) of operation; time parameters for the operation, such as start time, end time, and/or duration; a priority indicator for the operation, which may indicate a priority of an operation and/or subscription over another operation and/or subscription; and technical parameters of the signal for the operation, such as frequency, channel, and/or format.

FIG. 5 illustrates a process flow diagram of an embodiment method 500 for operation registration and conflict detection pipelining. In block 502 the co-existence manager 228, on the shared processor 216, may receive operation registration data for the scheduled operations for one or more active subscriptions from protocol stacks PS1, PS2 (input A) as described above with reference to FIG. 4. Receiving this operation registration data should occur within a time frame near to the scheduled time for executing the communication operations. The amount of time may be a predetermined number of units measurable in, for example, milliseconds, microseconds, processor cycles, or units of a common timer of the shared processor 216. In an embodiment, the predetermined number of units may be a minimum number of units, or more, required to allow the method 400 to complete. In some instances the predetermined number of units may be limited inorder to reduce the possibility of the operation registration data having the opportunity to change before it is analyzed. The times and units for each operation may differ based on the respective subscriptions.

Each operation registration data for each operation may need to be converted to the time and units of a common measure, for example, a process clock of the shared processor 216. The conversion, or alignment, of the time and units of the operation registration data and the common measure may be executed by each SIM for their respective operations, or by the shared processor 216 prior to passing the operation registration data to the co-existence manager 228. In another embodiment, the co-existence manager 228 may receive the operation registration data and convert, or align, the times and units as part of the process of registering the operation registration data.

In block 504 the co-existence manager 228 may assign the operation registration data from each of the active subscriptions to a buffer dedicated to each active subscription and determine which are the next operations to be executed. When multiple subscriptions are active, the co-existence manager may use dedicated buffers to keep the operation registration data for each active subscription in order and properly aligned with other operation registration data for operations of other active subscriptions scheduled to execute concurrently.

In block 506 the co-existence manager 228 may execute a conflicts check on operation registration data. The conflicts check may be executed a predetermined number units prior to the execution of the related operation. Like the predetermined number of units of block 502, the predetermined number of units may be measurable in, for example, milliseconds, microseconds, processor cycles, or units of a common timer of the shared processor 216. In an embodiment, the predetermined number of units may be a minimum number of units, or more, required to allow the mitigation method 400 to complete as described below. In some instances the predetermined number of units may be limited as to reduce the possibility of the operation registration data having the opportunity to change before it is analyzed. The times and units for each operation may differ based on the respective subscriptions.

In determination block 508 the co-existence manager 228 may determine whether a number of operations conflict in time. In other words, the analysis determines whether the time attributes for executing the operations related to the operation registration data overlap. In an example the co-existence manager 228 may compare whether a start time or end time of one operation falls between the start time and end time of another operation. Alternatively, if the time attributes of at least a first of the operations includes a start time and a duration, the co-existence manager 228 may determine whether the start time or end time of another operation falls after the start time of the first operation and during or after the duration time of the first operation. Similar analyses may be conducted for various combinations of time attribute formats.

When at least two operations conflict (i.e. the determination block 508="Yes"), in block 510 the co-existence manager 228 may determine whether an operation has priority over another operation in determination block 510. For example, a priority may be assigned to an operation based on its operation type, either Rx or Tx, and/or by its subscription. Priorities may also be assigned on a more dynamic basis, for example, based on use, time, location, or a combination of factors. Each operation may be assigned a priority indicator as part of its operation registration data. For example, the priority indicator may be a number or a code. The indicator may simply represent a value on a priority scale, or it may represent a more complex set of rules for determining a priority. When the priority indicator is simply a value on a priority scale, then the co-existence manager 228 may make a simple comparison of the values and determine whether one value represents a higher priority than another, or whether they are equal. If the priority indicator represents a more complex set of rules for determining a priority, for example a code that provides varying priorities depending on the operation with which it conflicts, then the co-existence manager 228 may be required to determine whether the priority values determine one operation has a higher priority than the other or if they are equal.

When one operation is determined to have priority over another (i.e. the determination block 510="Yes"), the co-existence manager 228 may determined whether the higher priority operation will be degraded or interfered with in determination block 512. To make this determination, the co-existence manager may implement one or more well know or proprietary calculations to determine the likelihood and/or degree of interference with and/or degradation of the higher priority operation. Such calculations may use characteristic information of the signal of the operation from the operation registration data Some such information may include, for example, the frequency, the amplitude, the channel, the power, the direction and or the length of the signal. The determination of degradation of or interference with the higher priority operation may be an absolute determination, or it may be one of degree. In other words, it may be determined by the co-existence manager 228 that any degradation or interference may be sufficient to determine that the higher priority operation will be degraded or interfered with. On the other hand, the co-existence manager 228 may require a certain level of degradation or interference above a nominal level to determine that the higher priority operation will be degraded or interfered with. In other embodiments, the co-existence manager 228 may alternatively determine whether the lower priority operation, or either operation, may be degraded or interfered with.

When the co-existence manager 228 determines that there will be sufficient degradation or interference (i.e. determination block 512="Yes"), the co-existence manager 228, or other software on the shared processor 216, may determine the appropriate mitigation procedure for the conflicting operations in block 514. The mitigation procedure may be any of a number of well known or proprietary mitigation procedures applied to one, some, or all of the conflicting operations. In block 516 the co-existence manager 228 may send instructions to implement the degradation mitigation procedure and to execute the non-conflicting operation(s) in the future time slot. In determination block 520 the co-existence manager 228 may determine whether there are any available operations pending on the buffers. When there is no pending operation on one of the buffers (i.e. the determination block 520="No"), the method 500 may terminate.

The embodiment method for operation registration and conflict detection pipelining 500 may loop to repeat the operations described above so long as there are pending operation registration data. So, when there is a pending operation (i.e. the determination block 520="Yes"), the co-existence manager 228 may return to block 506 to repeat the analysis of the operation as described above. Similarly, when the operation registration date received by co-existence manager 228 is yet to be buffered and analyzed, the co-existence manager 228 may repeatedly execute at the operations in block 504 described above. Alternatively, when new operation registration date is available, the co-existence manager 228 may perform the operations in block 502 described above.

When the co-existence manager 228 determines that there is not conflict in time (i.e. the determination block 508="No"), no priority between the operations (i.e. the determination block 510="No"), or there will be insufficient degradation or interference (i.e. determination block 512="No"), in block 518 the co-existence manager 228 may send instructions to execute the non-conflicting operation(s) in the future time slot. In determination block 520 the co-existence manager 228 may determine whether there are any available operations pending on the buffers. The determination block 520 may be implemented as described above.

Returning to FIG. 4, the embodiment method 400 for initiating operation registration and conflict detection pipelining may continue from either block 516 or block 518 described above. When continuing from block 516, in block 408 the shared processor 216 may receive instructions to implement a degradation mitigation procedure for a conflicting operation(s) and to execute the non-conflicting operation(s) in a future time slot from the co-existence manager 228. The shared processor 216 or other processor, such as the general processor 206, may select an appropriate degradation mitigation procedure depending on, for example, the type of interference that may result from the conflicting operations, the type of operations, and the necessary duration of implementation for the mitigation procedure.

When continuing from block 518, in block 410 the shared processor 216 may receive instructions to execute the non-conflicting operation(s) in a future time slot from the co-existence manager 228. In an embodiment, reaching block 410 may indicate that the co-existence manager 228 has identified the analyzed operations to be non-conflicting, non-prioritized, or to non-interfering with one another to a degree causing an unacceptable degradation in service for any of the active subscriptions at the time.

In block 412 the shared processor 216 may register the selected degradation mitigation procedure and/or the non-conflicting operation(s) for execution in a future time slot. When, in block 412, the shared processor 216 registers both the degradation mitigation procedure and the non-conflicting operation(s), the registration of the degradation mitigation procedure may occur such that it is schedule at a time appropriate to be applied to the subscription(s) set to implement the conflicting operation(s) so that the interference is appropriately mitigated. One such situation is when the degradation mitigation procedure is scheduled for implementation prior to the implementation of the conflicting operation(s). It may be possible to schedule the degradation mitigation procedure concurrently with the implementation of the conflicting operation(s) when the degradation mitigation procedure is to modify rather than preempt the conflicting operation(s). The instructions for scheduling and implementing the degradation mitigation procedures and non-conflicting operations are received by the protocol stacks PS1, PS2.

In block 414 the shared processor 216 may execute the degradation mitigation procedure and/or non-conflicting operation(s). In executing the degradation mitigation procedure, the shared processor 216 may signal various elements of the RF-resource chain 218a, 218b via the appropriate protocol stacks PS1, PS2 to modify their specific operations in executing the conflicting Rx/Tx operations.

The embodiment method 400 for initiating operation registration and conflict detection pipelining may loop by returning to block 406 to repeat the operations described above so long as there are future operations scheduled. Alternatively, even if the operation schedule received by DSDA device 200 contains further operations, when a schedule for a subscription of the DSDA device is available, the method 400 may preform the operations described above in block 404.

Figure 6:
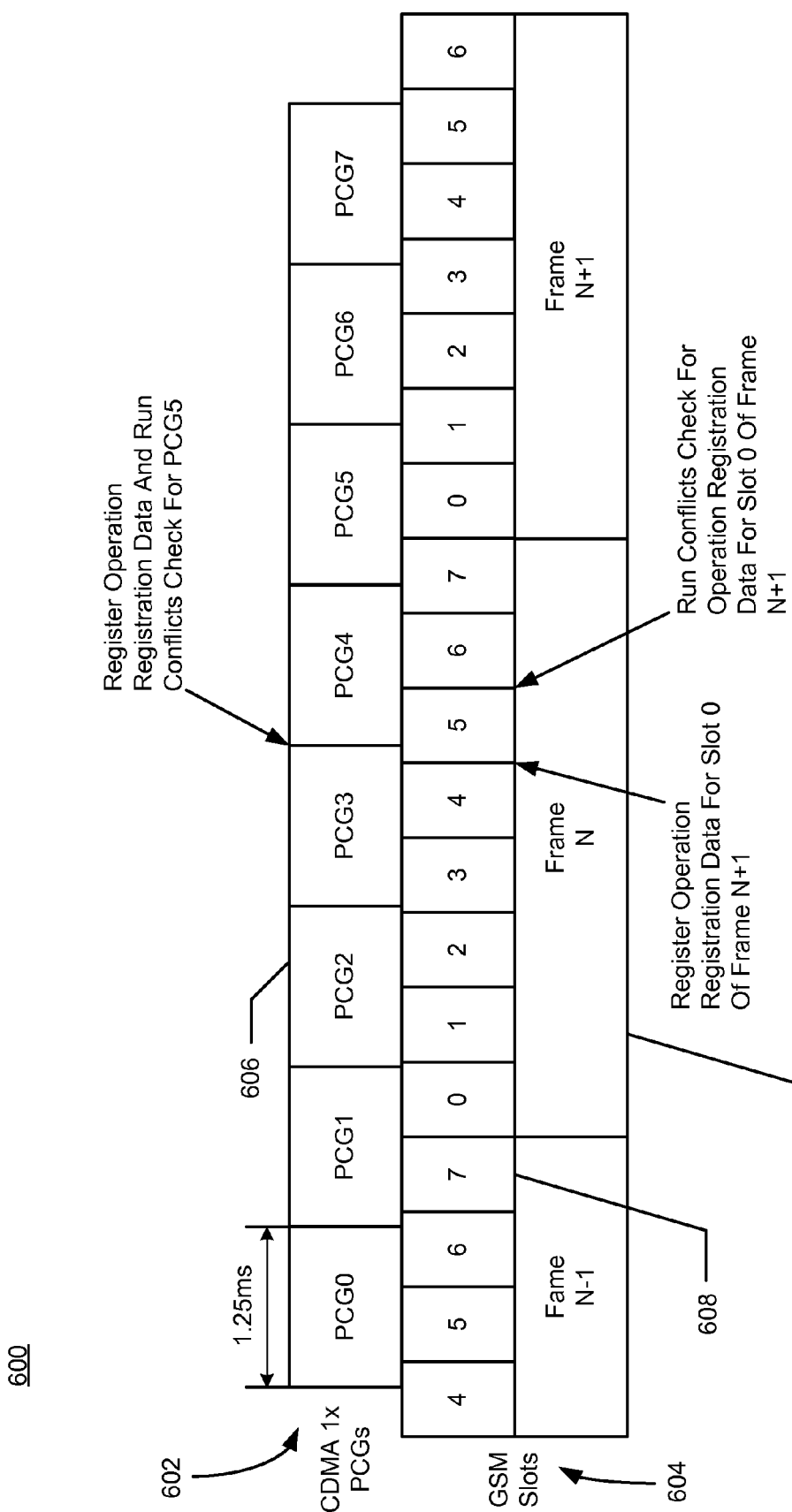
FIG. 6 is a component diagram illustrating operation schedules for multiple subscriptions.

FIG. 6 illustrates operation schedules for multiple subscriptions. In this example, the subscriptions include CDMA 1x and GSM subscription. A CDMA 1x schedule 602 may include a number of power control groups 606 (PCGs). A GSM schedule 605 may include a number of frames 610 further broken up into a number of slots 608 (in this example, 8 slots per frame). In this example, a CDMA 1x operation is scheduled for PCG5. The co-existence manager 228 may receive the operation registration data for the operation scheduled for PCG5 at PCG4, approximately 1.25 ms before the operation is scheduled to execute at PCG5. Once the operation registration data is registered for PCG5, while still in PCG4 the co-existence manager 228 may perform the conflicts check for PCG5 operation registration data.

Further, a GSM operation is scheduled for Frame N+1, Slot 0. The co-existence manager 228 may receive the operation registration data for the operation scheduled for Frame N+1, Slot 0 at Frame N, Slot 5, before the operation is scheduled to execute at Frame N+1, Slot 0. Once the operation registration data is registered for Frame N+1, Slot 0, the co-existence manager 228 may perform the conflicts check for Frame N+1, Slot 0 operation registration data during Frame N, Slot 6.

As shown in this example, assuming the two schedules are shown as temporally aligned to the common clock, a conflicts check on either the CDMA 1x operation scheduled for PCG5 or the GSM operation scheduled for Frame N+1, Slot 0 will result in a conflict in time. The registration of the operation registration data and the conflicts checks are shown to be executed at a time prior to the scheduled execution of their respective operations. The time at which the operation registration data and the conflicts checks are shown to be executed is generally less than 2 ms before the scheduled time for executing the respective operations.

Figure 7:
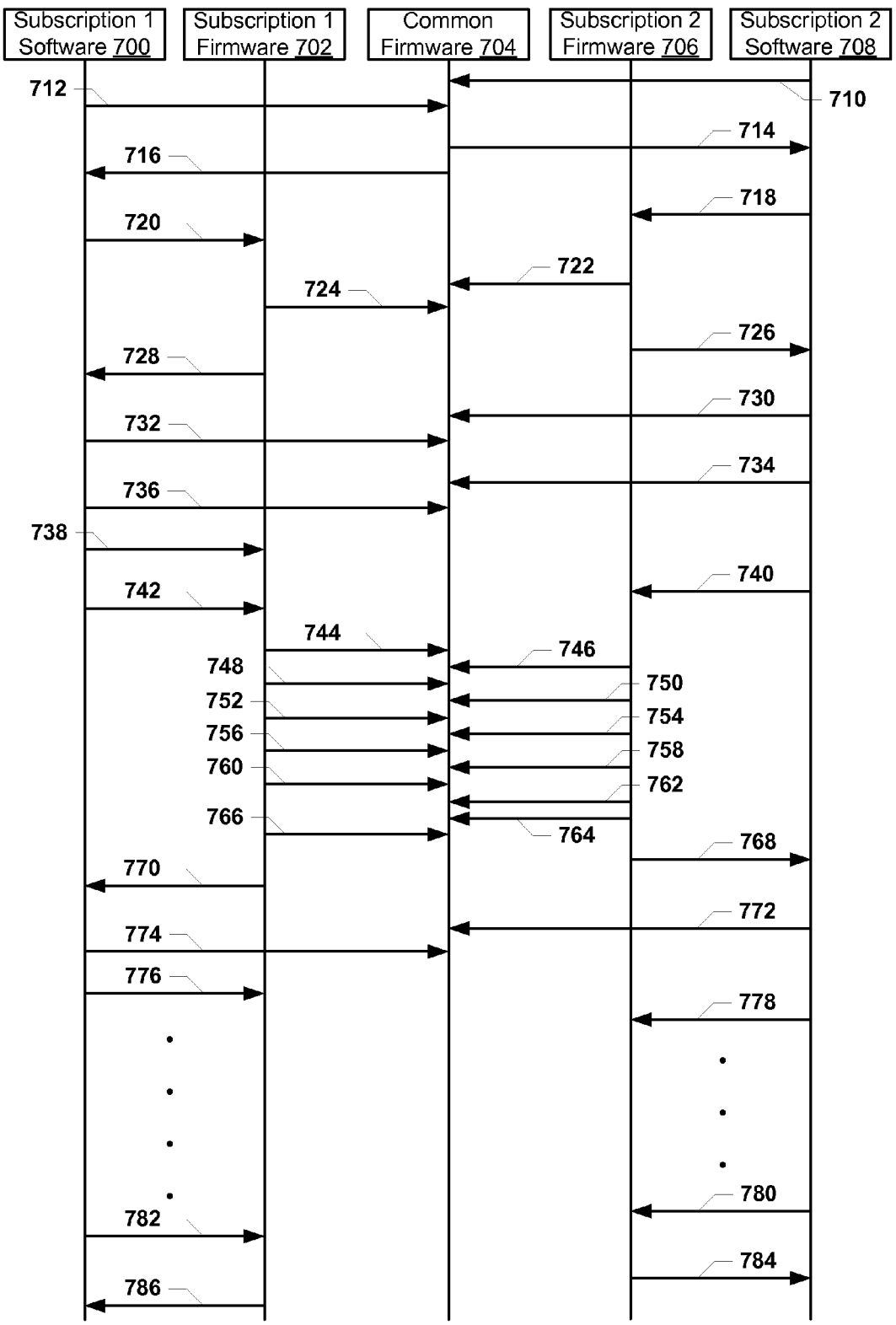
FIG. 7 is a call flow diagram illustrating example messages exchanged in an embodiment method for implementing operation registration and conflict detection pipelining.

FIG. 7 illustrates message flows among various software and firmware modules while implementing operation registration and conflict detection pipelining in the various embodiments. The instructions for the method may be sent between subscription 1 software 700 (SSW1), subscription 1 firmware 702 (SFW1), and common firmware 704 (CFW). The instructions may also be sent between CFW 704, subscription 2 firmware 706 (SFW2), and subscription 2 software 708 (SSW2). At least SFW1 702, CFW 704, and SFW2 706 may be executed in the shared processor 216. SSW1 700 and SSW2 708 may also be executed in the shared processor 216, or they may alternately be executed on the general processor 206, their respective SIMs 204a, 204b, or their respective RF-resource chains 218a, 218b. For the sake of example, subscription 1 may be WCDMA and the subscription 2 may be GSM.

Instructions SSW2 application enable 710 and SSW2 application enable response 714, and SSW1 application enable 712 and SSW1 application enable response 716 enable applications for executing their respective subscription processes. Instructions enable co-existence manager 718, 720, register Tx back-off/Rx blanking callbacks 722, 724, and co-existence manager response 726, 728 associate the respective subscriptions with the co-existence manager 228. These instructions may include specifying the access protocol for each related subscription to the shared processor 216.

Instructions query for co-existence may be issued 730, 732 that allow the respective software, SSW1 700 and SSW2 708 to recognize whether there are any possible co-existence issues with the subscription's long-term schedule. Instructions register long-term activity for rescheduling 734, 736 may be enacted in response to recognizing long-term co-existence issues. Subscription 1 may also reschedule a search for a base station using a random-access channel 738. Instructions register Rx/Tx priority for next frame 740, 742 provide the respective firmware, SFW1 702 and SFW2 706, with the priority information for the upcoming operations of the next frame.

The following instructions, 744-766, between SFW1 702, CFW 704, and SFW2 706 may each occur within a very short timeframe. Instructions register Rx/Tx priority for next scheduling interval 744, 746 may use the information previously provided in instructions 740, 742 to provide the co-existence manager 226 with the operation registration data. In this example, the operation for subscription 1 at this stage is Tx and for subscription 2 it is Rx. Instructions contest for Tx 748 and contest for Rx 750 represent the conflict checking done by the co-existence manager 226. In this example, there was a conflict in time between the subscription 1 Tx and the subscription 2 Rx, and the conflict check determined that the subscription 2 Rx had greater priority. Thus, instruction "if de-sense detected, do Tx blanking or back-off" 752 determines the likelihood and/or degree of degradation or interference the Tx may cause to the Rx and may implement the appropriate mitigation procedure if necessary. Instruction schedule for next slot 754 schedules the conflicting but higher priority Rx to execute during the next slot.

Another conflict check is executed for the next operations of the subscriptions, instruction contest for Rx 756 and contest for Tx 758. In this example, there was a conflict in time between the subscription 1 Rx and the subscription 2 Tx, and the conflict check determined that the subscription 1 Rx had greater priority. Thus, instruction schedule for next slot 760 schedules the conflicting but higher priority Rx to execute during the next slot. Instruction if de-sense detected, do Tx blanking or back-off 762 determines the likelihood and/or degree of degradation or interference the Tx may cause the Rx and may implement the appropriate mitigation procedure if necessary.

Instructions register Rx/Tx priority for next scheduling interval 764, 766 provide the co-existence manager 226 with the operation registration data. Instructions send back final action report 768, 770 inform SSW1 700 and SSW2 708 of the status of the operations that were scheduled to execute during the previous interval. Instructions query for co-existence issues 772, 774 allow the respective software, SSW1 700 and SSW2 708, to recognize if there are any possible co-existence issues with the subscription schedule. Instructions register Rx/Tx priority for next frame 776, 778 provide the respective firmware, SFW1 702 and SFW2 706, with the priority information for the upcoming operations of the next frame.

Many of the above instructions may be repeated as long as the subscriptions are active. When the subscriptions become inactive, instructions disable/deregister the co-existence manager 780, 782 and instructions co-existence manager disabled response 784, 786 may disassociate the inactive subscriptions from the co-existence manager 228.

Figure 8:
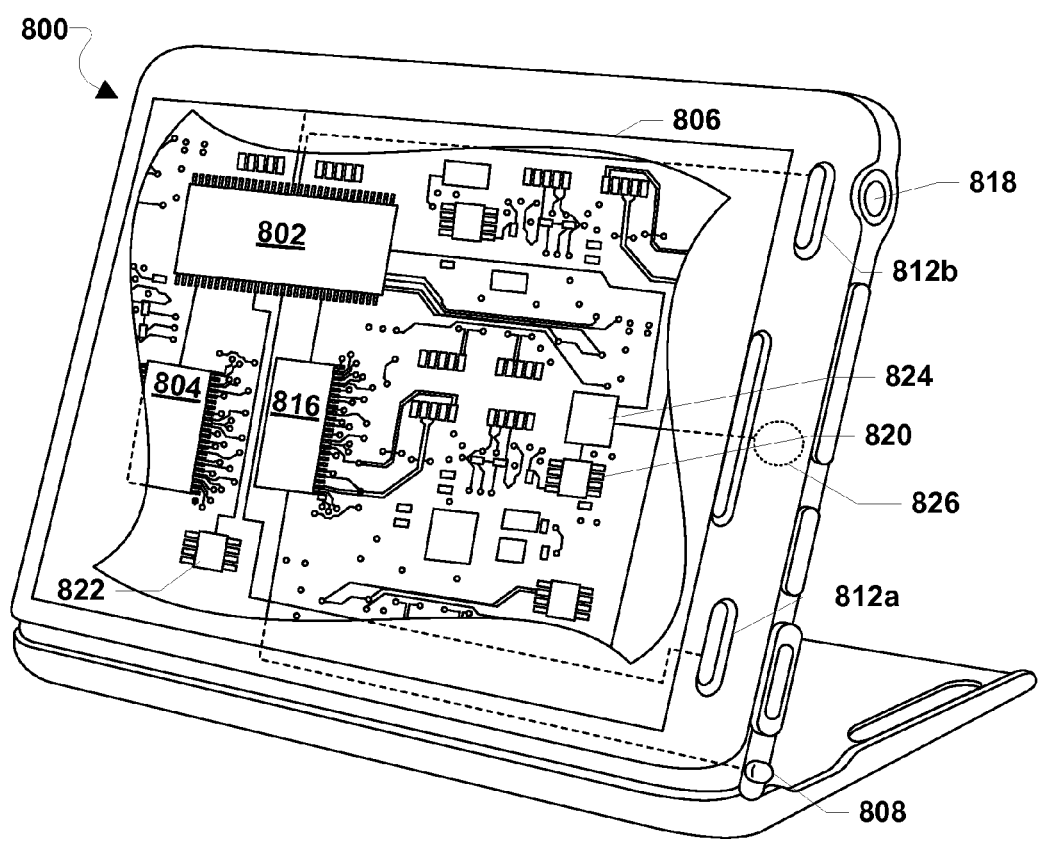
FIG. 8 is a component diagram of an example dual-SIM dual active device suitable for use with the various embodiments.

The various embodiments may be implemented in any of a variety of DSDA devices, an example of which is illustrated in FIG. 8. For example, the DSDA device 800 may include a processor 802 coupled to internal memory 804. Internal memory 804 may be volatile or non-volatile memory, and may also be secure and/or encrypted memory, or unsecure and/or unencrypted memory, or any combination thereof. The processor 802 may also be coupled to a touch screen display 806, such as a resistive-sensing touch screen, capacitive-sensing touch screen infrared sensing touch screen, or the like. Additionally, the display of the DSDA device 800 need not have touch screen capability. Additionally, the DSDA device 800 may have one or more antenna 808 for sending and receiving electromagnetic radiation that may be connected to a wireless data link and/or cellular telephone transceiver 816 coupled to the processor 802. The DSDA device 800 may also include physical buttons 812*a* and 812*b* for receiving user inputs. The DSDA device 800 may also include a power button 818 for turning the DSDA device 800 on and off. The DSDA device 800 may have a first SIM card 820 that utilize a cellular telephone transceiver 816 and one or more antennae 808 to connect to a first mobile network. The DSDA device may also have a second SIM card 822 that utilizes a second cellular telephone transceiver 824 and one or more antennae 826 to connect to a second mobile network.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of mitigating interference between communication operations in a wireless communication device having a shared processor configured to execute the method, the method comprising:

receiving, in a co-existence manager configured to be executed by the shared processor, data of a first future communication operation of a first communication circuit, wherein the first future communication operation is to occur in a future time slot, further wherein the data of the first future communication operation is received prior to the future time slot;

comparing, by the co-existence manager, the data of the first future communication operation with data of a second future communication operation of a second communication circuit prior to the future time slot;

determining, by the co-existence manager, based on the data of the first and second future communication operations whether a conflict will occur between the first and second future communication operations during the future time slot, comprising:

calculating, by the co-existence manager, an amount of interference from the second future communication operation affecting the first future communication operation during the future time slot;

determining, by the co-existence manager, whether the calculated amount of interference will exceed an acceptable threshold; and implementing an interference mitigating operation during the future time slot in response to determining that the conflict will occur between the first and second future communication operations during the future time slot.

2. The method of claim 1, further comprising receiving, in the co-existence manager, the data of the second future communication operation prior to the future time slot.

3. The method of claim 1, wherein receiving the data of the first future communication operation further comprises receiving, by the co-existence manager, the data of the first future communication operation at a first predetermined time prior to the future time slot, the method further comprising receiving, by the co-existence manager, the data of the second future communication operation at a second predetermined time prior to the future time slot, wherein comparing the data of the first future communication operation with the data of the second future communication operation further comprises comparing, by the co-existence manager, the data of the first future communication operation with the data of the second future communication operation at a third predetermined time prior to the future time slot.

4. The method of claim 3, wherein the first, second, and third predetermined times prior to the future time slot are measured on a microscopic scale.

5. The method of claim 1, wherein determining based on the data of the first and second future communication operations whether the conflict will occur between the first and second future communication operations during the future time slot comprises:

determining, by the co-existence manager, whether the first and second future communication operations are scheduled to implement during an overlapping time period;

determining, by the co-existence manager, whether the first future communication operation has a priority greater than that of the second future communication operation; and determining, by the co-existence manager, whether the future communication operations interference will cause a signal strength of one communication operation to fall below a threshold signal value.

6. The method of claim 1, further comprising affiliating, by the co-existence manager, a subscriber identification with a first wireless communication subscription implemented on the first communication circuit, wherein the first future communication operation supports the first wireless communication subscription and the second future communication operation supports a second wireless communication subscription implemented on the second communication circuit.

7. The method of claim 1, further comprising:

storing, by the co-existence manager, the data of the first future communication operation in a first data buffer; and storing, by the co-existence manager, the data of the second future communication operation to a second data buffer,
wherein comparing the data of the first future communication operation with the data of the second future communication operation comprises comparing, by the co-existence manager, data stored in the first data buffer to data stored in the second data buffer.

8. The method of claim 1, wherein the data of the first and second future communication operations comprise one or more of an operation type, a begin operation indicator, an end operation indicator, an operation frequency, and an operation priority.

9. The method of claim 1, further comprising:
receiving, in the co-existence manager, data of a third future communication operation, wherein the third future communication operation is to occur in another future time slot, further wherein the data of the third future communication operation is received prior to the other future time slot;
comparing, by the co-existence manager, the data of the third future communication operation with data of a forth future communication operation of the second communication circuit prior to the other future time slot;
determining, by the co-existence manager, based on the data of the third and fourth future communication operations whether a conflict will occur between the third and fourth future communication operations during the other future time slot; and
implementing the interference mitigating operation during the other future time slot in response to determining that the conflict will occur between the third and fourth future communication operations during the other future time slot.

10. A non-transitory processor-readable medium having stored thereon processor-executable software instructions configured to be executed by a shared processor to cause mitigation of interference between communication operations in a wireless communication device, the operations comprising:
receiving, in a co-existence manager configured to be executed by the shared processor, data of a first future communication operation of a first communication circuit wherein the first future communication operation is to occur in a future time slot, further wherein the data of the first future communication operation is received prior to the future time slot;
comparing, by the co-existence manager, the data of the first future communication operation with data of a second future communication operation of a second communication circuit prior to the future time slot;
determining, by the co-existence manager, based on the data of the first and second future communication operations whether a conflict will occur between the first and second future communication operations during the future time slot, comprising:
calculating by the co-existence manager, an amount of interference from the second future communication operation affecting the first future communication operation during the future time slot;
determining, by the co-existence manager, whether the calculated amount of interference will exceed an acceptable threshold; and
implementing an interference mitigating operation during the future time slot in response to determining that the conflict will occur between the first and second future communication operations during the future time slot.

11. The non-transitory processor-readable medium of claim 10, further comprising receiving, in the co-existence manager, the data of the second future communication operation prior to the future time slot.

12. The non-transitory processor-readable medium of claim 10, wherein receiving the data of the first future communication operation further comprises receiving, by the co-existence manager, the data of the first future communication operation at a first predetermined time prior to the future time slot,
the non-transitory processor-readable medium further comprising receiving, by the co-existence manager, the data of the second future communication operation at a second predetermined time prior to the future time slot,
wherein comparing the data of the first future communication operation with the data of the second future communication operation further comprises comparing, by the co-existence manager, the data of the first future communication operation with the data of the second future communication operation at a third predetermined time prior to the future time slot.

13. The non-transitory processor-readable medium of claim 12, wherein the first, second, and third predetermined times prior to the future time slot are measured on a microscopic scale.

14. The non-transitory processor-readable medium of claim 10, wherein determining based on the data of the first and second future communication operations whether the conflict will occur between the first and second future communication operations during the future time slot comprises:
determining, by the co-existence manager, whether the first and second future communication operations are scheduled to implement during an overlapping time period;
determining, by the co-existence manager, whether the first future communication operation has a priority greater than that of the second future communication operation; and
determining, by the co-existence manager, whether the future communication operations interference will cause a signal strength of one communication operation to fall below a threshold signal value.

15. The non-transitory processor-readable medium of claim 10, further comprising affiliating, by the co-existence manager, a subscriber identification with a first wireless communication subscription implemented on the first communication circuit, wherein the first future communication operation supports the first wireless communication subscription and the second future communication operation supports a second wireless communication subscription implemented on the second communication circuit.

16. The non-transitory processor-readable medium of claim 10, further comprising:
storing, by the co-existence manager, the data of the first future communication operation in a first data buffer; and
storing, by the co-existence manager, the data of the second future communication operation to a second data buffer,
wherein comparing the data of the first future communication operation with the data of the second future communication operation comprises comparing, by the co-existence manager, data stored in the first data buffer to the data stored in the second data buffer.

17. The non-transitory processor-readable medium of claim 10, wherein the data of the first and second future communication operations comprise one or more of an operation type, a begin operation indicator, an end operation indicator, an operation frequency, and an operation priority.

18. The non-transitory processor-readable medium of claim 10, further comprising:
  receiving, in the co-existence manager, data of a third future communication operation, wherein the third future communication operation is to occur in another future time slot, further wherein the data of the third future communication operation is received prior to the other future time slot;
  comparing, by the co-existence manager, the data of the third future communication operation with data of a forth future communication operation of the second communication circuit prior to the other future time slot;
  determining, by the co-existence manager, based on the data of the third and fourth future communication operations whether a conflict will occur between the third and fourth future communication operations during the other future time slot; and
  implementing the interference mitigating operation during the other future time slot in response to determining that the conflict will occur between the third and fourth future communication operations during the other future time slot.

19. A wireless communication device capable of interacting with a plurality of wireless networks, comprising:
  a plurality of communication circuits each associated with one or more active wireless communication subscriptions;
  a shared processor coupled to the communication circuits, wherein the shared processor is configured with processor-executable instructions to:
    implement a protocol stack for each active communication subscription;
    implement a modem for each communication circuit; and
    implement a co-existence manager configured to perform operations comprising:
      receiving, from a first communication circuit, data of a first future communication operation, wherein the first future communication operation is to occur in a future time slot, further wherein the data of the first future communication operation is received prior to the future time slot;
      comparing the data of the first future communication operation with data of a second future communication operation of a second communication circuit prior to the future time slot;
      determining based on the data of the first and second future communication operations whether a conflict will occur between the first and second future communication operations during the future time slot, comprising:
        calculating an amount of interference from the second future communication operation affecting the first future communication operation during the future time slot;
        determining whether the calculated amount of interference will exceed an acceptable threshold; and
      implementing an interference mitigating operation during the future time slot in response to determining that the conflict will occur between the first and second future communication operations during the future time slot.

20. The wireless communication device of claim 19, wherein the co-existence manager is further configured to perform operations comprising:
  receiving, from the second communication circuit, the data of the second future communication operation prior to the future time slot.

21. The wireless communication device of claim 19, wherein receiving the data of the first future communication operation further comprises receiving the data of the first future communication operation at a first predetermined time prior to the future time slot,
  the co-existence manager further configured to perform operations comprising:
    receiving the data of the second future communication operation at a second predetermined time prior to the future time slot,
    wherein comparing the data of the first future communication operation with the data of the second future communication operation further comprises comparing the data of the first future communication operation with the data of the second future communication operation at a third predetermined time prior to the future time slot.

22. The wireless communication device of claim 21, wherein the first, second, and third predetermined times prior to the future time slot are measured on a microscopic scale.

23. The wireless communication device of claim 19, wherein determining based on the data of the first and second future communication operations whether the conflict will occur between the first and second future communication operations during the future time slot comprises:
  determining whether the first and second future communication operations are scheduled to implement during an overlapping time period;
  determining whether the first future communication operation has a priority greater than that of the second future communication operation; and
  determining whether the future communication operations interference will cause a signal strength of one communication operation to fall below a threshold signal value.

24. The wireless communication device of claim 19, wherein the co-existence manager is further configured to perform operations comprising:
  affiliating a subscriber identification with a first wireless communication subscription implemented on the first communication circuit, wherein the first future communication operation supports the first wireless communication subscription and the second future communication operation supports a second wireless communication subscription implemented on the second communication circuit.

25. The wireless communication device of claim 19, wherein the co-existence manager is further configured to perform operations comprising:
  storing the data of the first future communication operation in a first data buffer; and
  storing the data of the second future communication operation to a second data buffer,
  wherein comparing the data of the first future communication operation with the data of the second future communication operation comprises comparing data stored in the first data buffer to data stored in the second data buffer.

26. The wireless communication device of claim 19, wherein the data of the first and second future communication operations comprise one or more of an operation type, a begin operation indicator, an end operation indicator, an operation frequency, and an operation priority.

27. The wireless communication device of claim 19, wherein the co-existence manager is further configured to perform operations comprising:
- receiving, from the first communication circuit, data of a third future communication operation, wherein the third future communication operation is to occur in another future time slot, further wherein the data of the third future communication operation is received prior to the other future time slot;
- comparing the data of the third future communication operation with data of a forth future communication operation of the second communication circuit prior to the other future time slot;
- determining based on the data of the future third and fourth communication operations whether a conflict will occur between the third and fourth future communication operations during the other future time slot; and
- implementing the interference mitigating operation during the other future time slot in response to determining that the conflict will occur between the third and fourth future communication operations during the other future time slot.

28. A device, comprising:
- means for receiving, in a co-existence manager configured to be executed by a shared processor, data of first future communication operation of a first communication circuit, wherein the first future communication operation is to occur in a future time slot, further wherein that the data of the first future communication operation is received prior to the future time slot;
- means for comparing, by the co-existence manager, the data of the first future communication operation with data of a second future communication operation of a second communication circuit prior to the future time slot;
- means for determining, by the co-existence manager, based on the data of the first and second future communication operations whether a conflict will occur between the first and second future communication operations during the future time slot, comprising:
  - means for calculating, by the co-existence manager, an amount of interference from the second future communication operation affecting the first future communication operation during the future time slot;
  - means for determining, by the co-existence manager, whether the calculated amount of interference will exceed an acceptable threshold by the co-existence manager; and
- means for implementing an interference mitigating operation during the future time slot in response to determining that the conflict will occur between the first and second future communication operations during the future time slot.

29. The device of claim 28, further comprising means for receiving, in the co-existence manager, the data of the second future communication operation prior to the future time slot.

30. The device of claim 28, wherein means for receiving the data of the first future communication operation further comprises means for receiving the data of the first future communication operation at a first predetermined time prior to the future time slot,
- the device further comprising means for receiving, by the co-existence manager, the data of the second future communication operation at a second predetermined time prior to the future time slot,
- wherein the means for comparing the data of the first future communication operation with the data of the second future communication operation further comprises means for comparing, by the co-existence manager, the data of the first future communication operation with the data of the second future communication operation at a third predetermined time prior to the future time slot.

31. The device of claim 30, wherein the first, second, and third predetermined times prior to the future time slot are measured on a microscopic scale.

32. The device of claim 28, wherein the means for determining based on the data of the first and second future communication operations whether the conflict will occur between the first and second future communication operations during the future time slot comprises:
- means for determining, by the co-existence manager, whether the first and second future communication operations are scheduled to implement during an overlapping time period;
- means for determining, by the co-existence manager, whether the first future communication operation has a priority greater than that of the second future communication operation; and
- means for determining, by the co-existence manager, whether the future communication operations interference will cause a signal strength of one communication operation to fall below a threshold signal value.

33. The device of claim 28, further comprising means for affiliating, by the co-existence manager, a subscriber identification with a first wireless communication subscription implemented on the first communication circuit, wherein the first future communication operation supports the first wireless communication subscription and the second future communication operation supports a second wireless communication subscription implemented on the second communication circuit.

34. The device of claim 28, further comprising:
- means for storing, by the co-existence manager, the data of the first future communication operation in a first data buffer; and
- means for storing, by the co-existence manager, the data of the second future communication operation to a second data buffer,
- wherein the means for comparing the data of the first future communication operation with the data of the second future communication operation comprises means for comparing, by the co-existence manager, data stored in the first data buffer to data stored in the second data buffer.

35. The device of claim 28, wherein the data of the first and second future communication operations comprise one or more of an operation type, a begin operation indicator, an end operation indicator, an operation frequency, and an operation priority.

36. The device of claim 28, further comprising:
- means for receiving, in the co-existence manager, data of a third future communication operation, wherein the third future communication operation is to occur in another future time slot, further wherein the data of the third future communication operation is received prior to the other future time slot;
- means for comparing, by the co-existence manager, the data of the third future communication operation with data of a forth future communication operation of the second communication circuit prior to the other future time slot;
- means for determining, by the co-existence manager, based on the data of the third and fourth future communication operations whether a conflict will occur between the third and fourth future communication operations during the other future time slot; and means for implementing the interference mitigating operation during the other future time slot in response to determining that the conflict will occur between the third and fourth future communication operations during the other future time slot.

* * * * *